(12) United States Patent
Kanesaka

(10) Patent No.: US 11,556,027 B2
(45) Date of Patent: Jan. 17, 2023

(54) DISPLAY DEVICE

(71) Applicant: Japan Display Inc., Tokyo (JP)

(72) Inventor: Yuuichi Kanesaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/326,420

(22) Filed: May 21, 2021

(65) Prior Publication Data

US 2021/0364849 A1 Nov. 25, 2021

(30) Foreign Application Priority Data

May 22, 2020 (JP) .............................. JP2020-089672

(51) Int. Cl.

| | | |
|---|---|---|
| *G02F 1/1333* | (2006.01) | |
| *G02F 1/1334* | (2006.01) | |
| *G02F 1/13357* | (2006.01) | |
| *G02F 1/1335* | (2006.01) | |

(52) U.S. Cl.
CPC ...... *G02F 1/133382* (2013.01); *G02F 1/1334* (2013.01); *G02F 1/133524* (2013.01); *G02F 1/133615* (2013.01); *G02F 1/133616* (2021.01); *G02F 2201/56* (2013.01)

(58) Field of Classification Search
CPC ......... G02F 1/133615; G02F 1/133616; G02F 1/133382; G02F 2201/56; G02F 1/1334; G02F 1/13452; G02F 1/13454
See application file for complete search history.

(56) References Cited

U.S. PATENT DOCUMENTS

| | | | | |
|---|---|---|---|---|
| 6,229,585 | B1* | 5/2001 | Yanagi | G02F 1/133615 |
| | | | | 362/616 |
| 2005/0013127 | A1* | 1/2005 | Tsai | G02B 6/002 |
| | | | | 362/613 |
| 2012/0002139 | A1* | 1/2012 | Nakajima | G02B 6/0028 |
| | | | | 349/65 |
| 2019/0079323 | A1* | 3/2019 | Kurokawa | G02F 1/133553 |
| 2019/0324305 | A1* | 10/2019 | Numata | G02F 1/133512 |
| 2020/0310175 | A1* | 10/2020 | Okuyama | G02F 1/133615 |

FOREIGN PATENT DOCUMENTS

JP 2019-191230 A 10/2019

\* cited by examiner

*Primary Examiner* — Jia X Pan
(74) *Attorney, Agent, or Firm* — Maier & Maier, PLLC

(57) ABSTRACT

According to one embodiment, a display device includes a first transparent substrate including a first end portion, a second transparent substrate including a second end portion and opposing the first transparent substrate and a plurality of light-emitting devices provided along the second end portion, and the first transparent substrate includes a first driver provided in a first region located between the first end portion and the second end portion and located without overlapping the second transparent substrate in planar view, the second end portion includes a concavity, and at least one first light-emitting device of the light emitting devices, provided along the concavity, oppose the first driver with a predetermined interval therebetween.

14 Claims, 11 Drawing Sheets

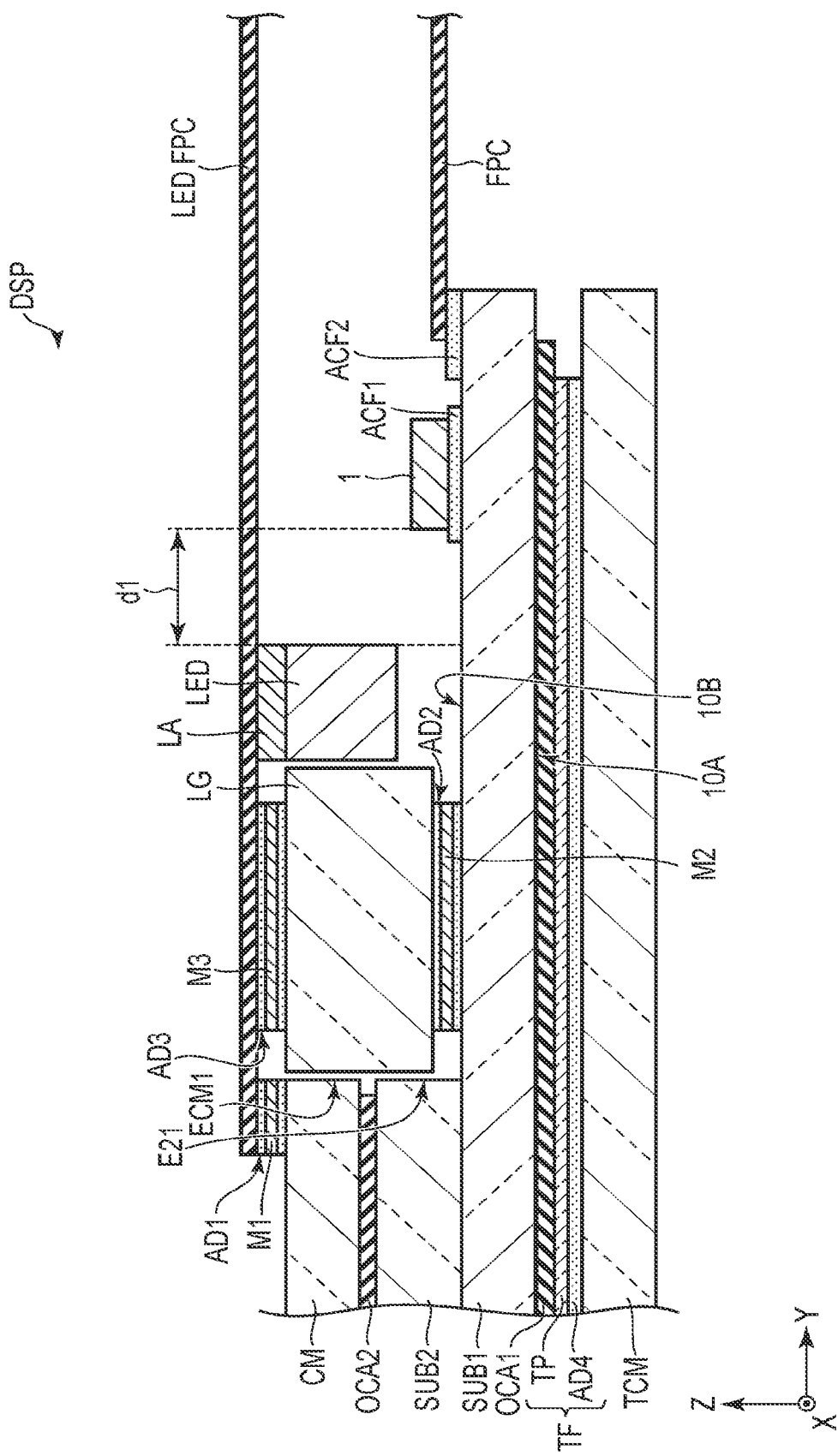
F I G. 4

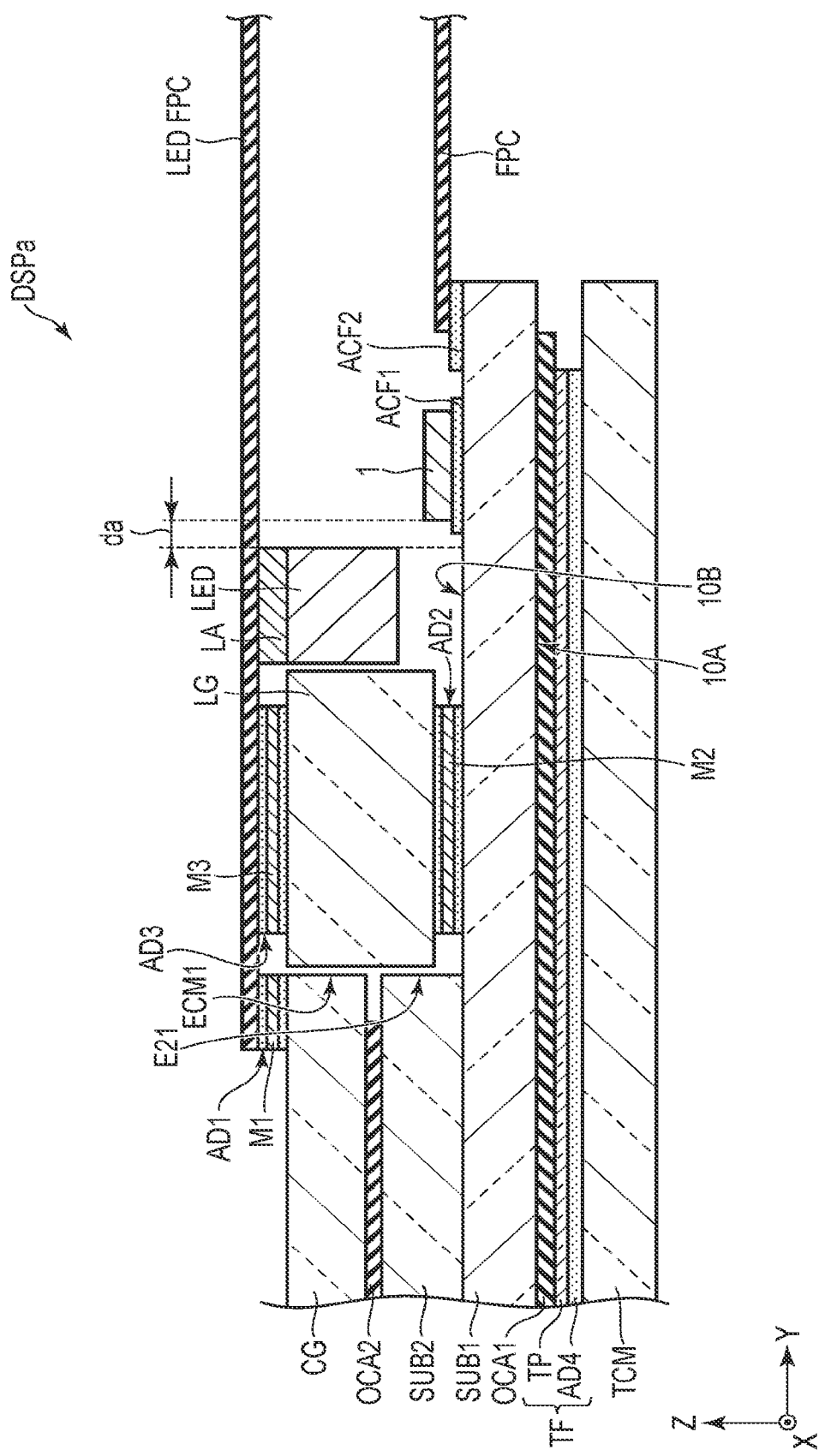
F I G. 6

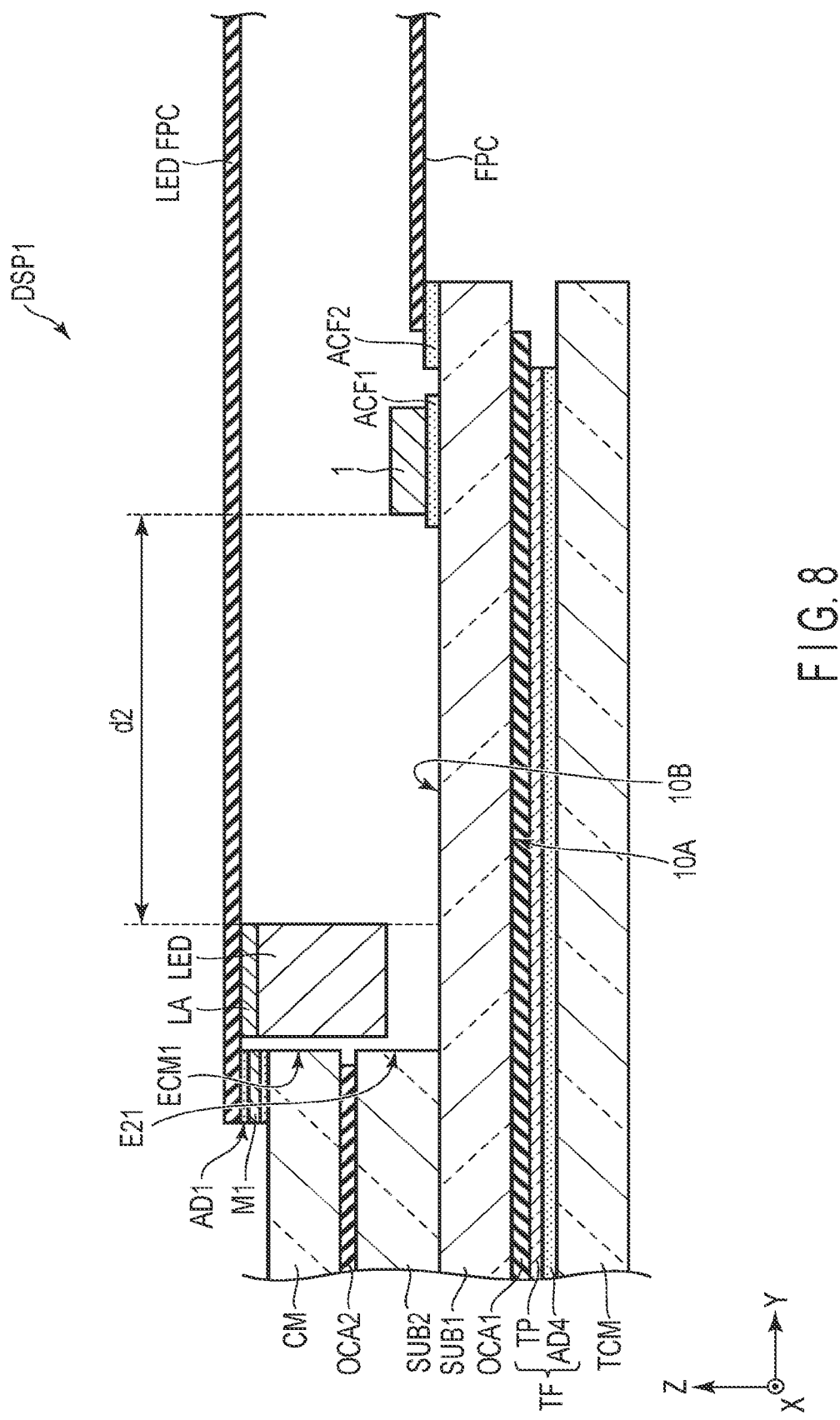
F I G. 8

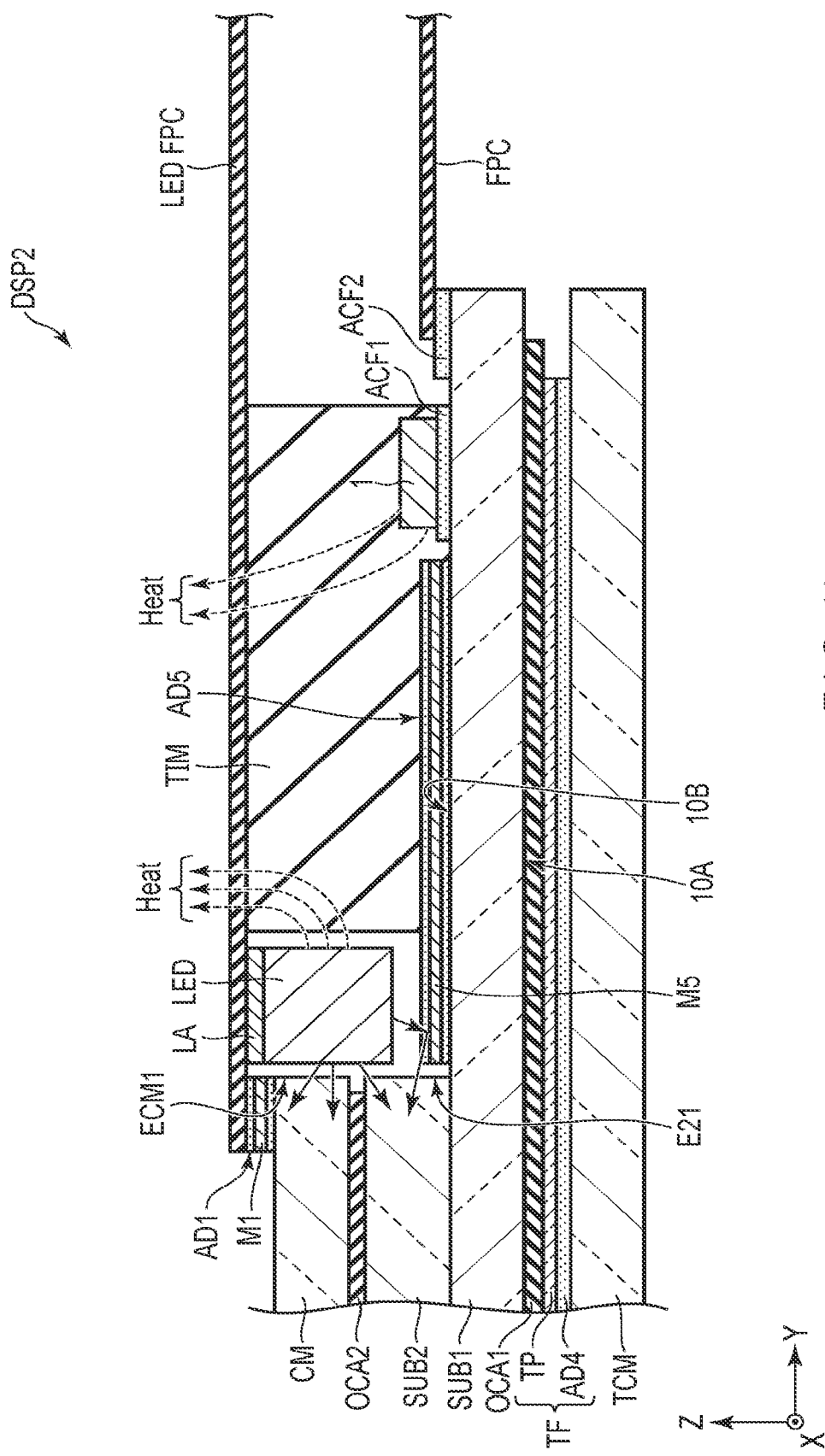
F I G. 11

DISPLAY DEVICE

CROSS-REFERENCE TO RELATED APPLICATIONS

This application is based upon and claims the benefit of priority from Japanese Patent Application No. 2020-089672, filed May 22, 2020, the entire contents of which are incorporated herein by reference.

FIELD

Embodiments described herein relate generally to a display device.

BACKGROUND

Recently, a display device comprising a light source, a pair of substrates including a pixel electrode and a common electrode and a polymer dispersed liquid crystal layer disposed between the substrates (which will be referred to as a transparent display, hereinafter) is known. In such a transparent display, the light source is provided on a side portion of the liquid crystal layer, and as a result, the interval between the light source and various drivers tends to be short. With this structure, the heat generated when the light source is on, and the heat generate by various drivers when they are driven may not be radiated sufficiently. When the heat is sufficiently radiated, for example, the temperatures of the various drivers may exceed the heatproof temperature, which may cause troubles in these drivers.

BRIEF DESCRIPTION OF THE DRAWINGS

FIG. 4 is a cross section taken along line A-B indicated in FIG. 3.

FIG. 6 is a cross section taken along line C-D indicated in FIG. 5.

FIG. 8 is a cross section taken along line E-F indicated in FIG. 7.

FIG. 11 is a cross sectional view showing a configuration example of the display device according to a modified example of the third embodiment.

DETAILED DESCRIPTION

In general, according to one embodiment, a display device comprises a first transparent substrate including a first end portion, a second transparent substrate including a second end portion and opposing the first transparent substrate and a plurality of light-emitting devices provided along the second end portion, and the first transparent substrate comprises a first driver provided in a first region located between the first end portion and the second end portion and located without overlapping the second transparent substrate in planar view, the second end portion includes a concavity, and at least one first light-emitting device of the plurality of light emitting devices, provided along the concavity, oppose the first driver with a predetermined interval therebetween.

According to another embodiment, a display device comprises a first transparent substrate including a first end portion, a second transparent substrate including a second end portion and opposing the first transparent substrate, a third transparent substrate including a third end portion and opposing the second transparent substrate, a plurality of light-emitting devices opposing the second end portion and the third end portion and a light guide provided between the second end portion or the third end portion, and the plurality of light-emitting devices, and the first transparent substrate comprises a first driver provided in a first region located between the first end portion and the light guide and located without overlapping the second transparent substrate and the third transparent substrate in planar view, the second end portion and the third end portion include a first concavity, the light guide includes a convexity overlapping the first concavity in planar view and a second concavity opposing the convexity, and at least one first light-emitting device of the plurality of light-emitting devices, provided along the second concavity is spaced apart from the first driver with a predetermined interval therebetween.

Various embodiments will be described hereinafter with reference to the accompanying drawings.

Note that the disclosure is a mere example, and arbitrary change of gist which can be easily conceived by a person of ordinary skill in the art naturally falls within the inventive scope. In addition, in some cases, in order to make the description clearer, the drawings are illustrated schematically, rather than as an accurate representation of what is implemented. However, such schematic illustration is merely exemplary, and in no way restricts the interpretation of the invention. Further, in the specification and drawings, structural elements which function in the same or a similar manner to those described in connection with preceding drawings are denoted by like reference numbers, detailed description thereof being omitted unless necessary.

First Embodiment

Figure 1:
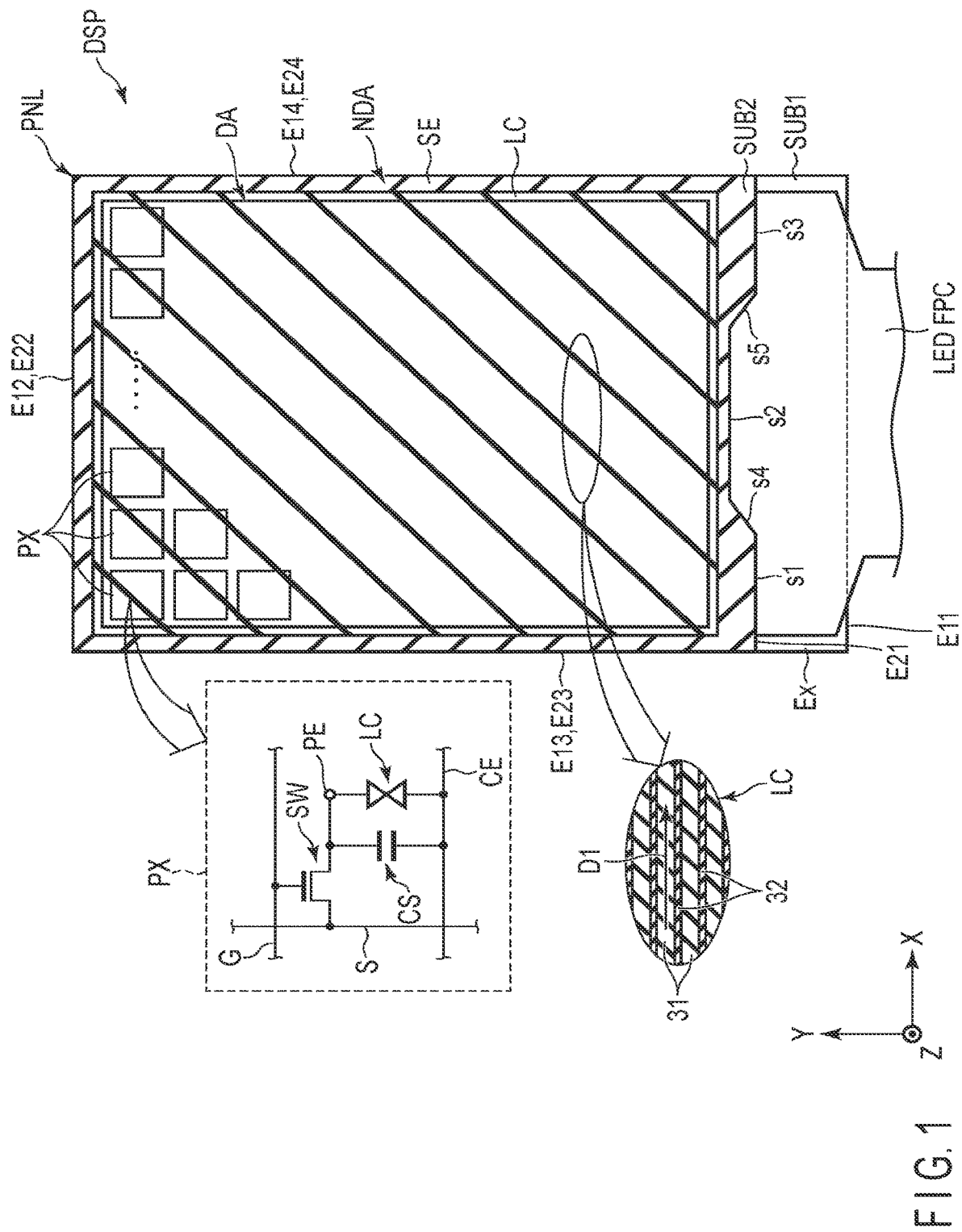
FIG. 1 is a plan view showing a configuration example of a display device according to a first embodiment.

FIG. 1 is a plan view showing a configuration example of a display device DSP according to this embodiment. For example, a first direction X, a second direction Y and a third direction Z are orthogonal to each other, but may intersect at an angle other than ninety degrees. The first direction X and the second direction Y correspond to the directions parallel to the main surface of a substrate which constitutes the display device DSP, and the third direction Z corresponds to the thickness direction of the display device DSP. In the following explanation, a direction from a first substrate SUB1 toward a second substrate SUB2 is referred to as upward (or merely above), and a direction from the second substrate SUB2 toward the first substrate SUB1 is referred to as downward (or merely below). With such expressions as "a second member above a first member" and "a second member below a first member", they are meant that the second member may be in contact with the first member or may be remote from the first member. An observation position at which the display device DSP is observed is assumed to be located on the tip side of the arrow indicating the third direction Z, and viewing from the observation position toward the X-Y plane defined by the first direction X and the second direction Y is called a planar view.

In this embodiment, a liquid crystal display device in which polymer dispersed liquid crystal is applied (a transparent display) will be described as an example of the display device DSP. As shown in FIG. 1, the display device DSP comprises a display panel PNL and a first wiring substrate LEDFPC.

The display panel PNL comprises a first substrate SUB1, a second substrate SUB2, a liquid crystal layer LC and a sealant SE. The first substrate SUB1 and the second substrate SUB2 are each formed into a flat plate parallel to the X-Y plane. The first substrate SUB1 and the second substrate SUB2 are overlaid with respect to each other in planar view. The first substrate SUB1 and the second substrate SUB2 are adhered to each other by the sealant SE. The liquid crystal layer LC is held between the first substrate SUB1 and the second substrate SUB2 and sealed by the sealant SE. In FIG. 1, the liquid crystal layer LC and the sealant SE are indicated by different hatch lines.

As schematically shown in FIG. 1 in an enlarged manner, the liquid crystal layer LC comprise polymer dispersed liquid crystal containing a polymer 31 and liquid crystal molecules 32. For example, the polymer 31 are liquid crystal polymers. The polymer 31 extend in stripe manner. An extending direction D1 of the polymer 31 is parallel to the first direction X. The liquid crystal molecules 32 are dispersed in gaps of the polymer 31 and aligned such that their major axis extends along the first direction X. The polymer 31 and the liquid crystal molecules 32 have optical anisotropy or refractive anisotropy. The response performance of the polymer 31 with respect to the electric field is lower than the response performance of the liquid crystal molecules 32 to the electric field.

For example, the direction of alignment of the polymer 31 is not substantially varied regardless of whether an electric field is present or absent. On the other hand, the direction of alignment of the liquid crystal molecules 32 is varied in accordance with the electric field in a state where a voltage higher than the threshold value is applied to the liquid crystal layer 30. In the state where voltage is not applied to the liquid crystal layer LC, optical axes of the polymer 31 and the liquid crystal molecules 32 are parallel each other and therefore light entering the liquid crystal layer LC is transmitted therein without being substantially scattered in the liquid crystal layer LC (a transparent state). In the state voltage is applied to the liquid crystal layer LC, the optical axes of the polymer 31 and the liquid crystal molecules 32 cross each other, and the light entering the liquid crystal layer LC is scattered in the liquid crystal layer LC (a scattering state).

The display panel PNL includes a display area DA which displays images and a frame-shaped non-display area NDA surrounding the display area DA. The sealant SE is located in the non-display portion NDA. The display area DA comprises pixels PX arranged in a matrix form along the first direction X and the second direction Y.

As enlargedly shown in FIG. 1, each of the pixels PX comprises a switching element SW, a pixel electrode PE, a common electrode CE, a liquid crystal layer LC and the like. The switching element SW is formed of, for example, a thin-film transistor (TFT) and is electrically connected to a scanning line G and a signal line S. The scanning line G is connected to the switching element SW of each of the pixels PX arranged along the first direction X. The signal line S is connected to the switching element SW of each the pixels PX arranged along the second direction Y. The pixel electrode PE is electrically connected to the switching element SW. Each of the pixel electrodes PE opposes the common electrode CE, and drives the liquid crystal layer LC (especially, the liquid crystal molecules 32) by an electric field generated between the pixel electrode PE and the common electrode CE. For example, the capacity CS is formed between an electrode at the same potential as that of the common electrode CE and an electrode at the same potential as that of the pixel electrode PE.

The first substrate SUB1 includes end portions E11 and 512 extending along the first direction X, and end portions E13 and E14 extending in the second direction Y. The end portion E11 may be referred to as the first end portion.

The second substrate SUB2 includes an end portion E21 at least partially extending along first direction X, an end portion E22 extending along the first direction X and end portions E23 and E24 extending along the second direction Y. The end portion E21 may be referred to as the second end portion. The end portion E21 comprises a concavity. More specifically, the end portion E21 comprises a first edge s1, a second edge s2 and a third edge s3, extending along the first direction X, a first slant edge s4 connecting the first edge s1 and the second edge s2, and a second slant edge s5 connecting the second edge s2 and the third edge s3, and the second edge s2, the first slant edge s4 and the second slant edge s5 form a tapered concavity.

In the example illustrated, the end portions E11 and E22 are superposed one on another in planar view, and so are the end portions E13 and E23, and the end portions E14 and E24. The end portion E21 is located between the end portion E11 and the display area DA (the liquid crystal layer LC) in planar view. The first substrate SUB1 includes an extended portion Ex between the end portions E11 and E21. The extended portion Ex may be referred to as the first region.

A first wiring substrates LED FPC is electrically connected to a light-emitting device, which will be described later. The first wiring substrate LEDFPC is a bendable flexible printed circuit board. The first wiring substrate LEDFPC has a shape matching along the end portion E21 of the second substrate SUB2. In other words, the first wiring substrate LEDFPC have a convexity which is superposed on the concavity of the end portion E21 of the second substrate SUB2 in planar view.

Figure 2:
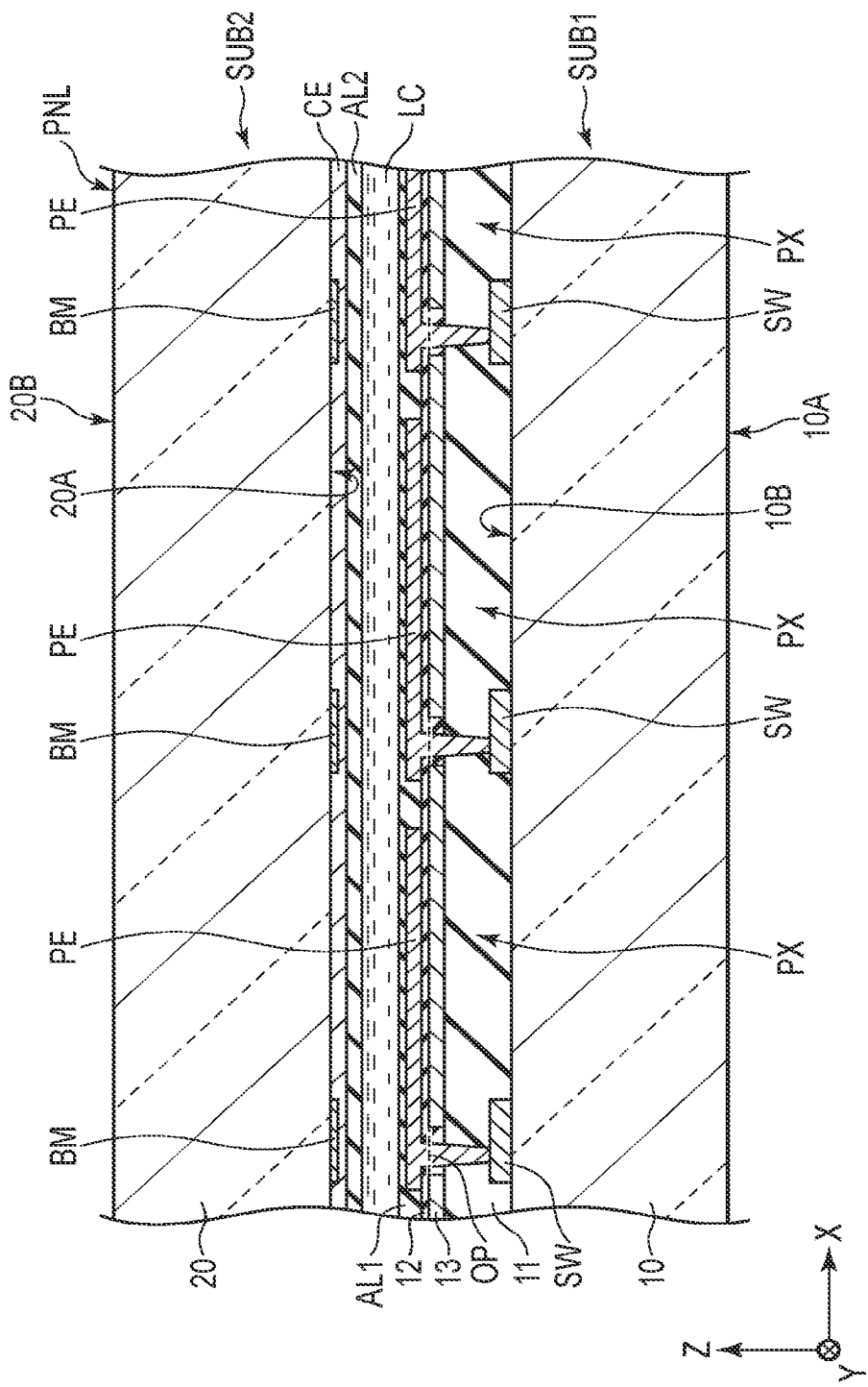
FIG. 2 is a cross sectional view showing a configuration example of the display panel according to the first embodiment.

FIG. 2 is a cross-sectional view showing an configuration example of the display panel PNL shown in FIG. 1. FIG. 2 shows a cross section of the display area DA.

The first substrate SUB1 comprises a transparent substrate 10, insulating films 11 and 12, capacity (capacitive) electrodes 13, switching elements SW, pixel electrodes PE and an alignment film AL1. The transparent substrate 10 may be referred to as the first transparent substrate. Note that, though the illustration thereof is omitted from FIG. 2, the first substrate SUB1 further comprise scanning lines G and signal lines S shown in FIG. 1. The transparent substrate 10 comprises a main surface (lower surface) 10A and a main surface (upper surface) 10B on an opposite side to the main surface 10A. The switching element SW is disposed on the main surface 10B. The insulating film 11 covers the switching elements SW. The capacity electrodes 13 are located between the insulating films 11 and 12. The pixel electrodes PE are each disposed for each pixel PX on the insulating film 12. The pixel electrodes PE are electrically connected to the respective switching elements SW through opening portions OP of the respective capacity electrodes 13. The pixel electrodes PE overlap the capacity electrodes 13, respectively, while interposing the insulating film 12 therebetween and form capacitors CS of the respective pixels PX. The alignment film AL1 covers the pixel electrodes PE.

The second substrate SUB2 comprises a transparent substrate 20, light-shielding layers BM, a common electrode CE and an alignment film AL2. The transparent substrate 20 may be referred to as the second transparent substrate. The transparent substrate 20 comprises a main surface (lower surface) 20A and a main surface (upper surface) 20B on an opposite side to the main surface 20A. The main surface 20A of the transparent substrate 20 opposes the main surface 10B of the transparent substrate 10. The light-shielding layers BM and the common electrode CE are disposed on the main surface 20A. The light-shielding layers BM are located, for example, immediately above the respective switching elements SW, and immediately above the respective scanning lines G and signal lines S (not shown). The common electrode CE is disposed over a plurality of pixel PX, and directly covers the light-shielding layers BM. The common electrode CE is electrically connected to the capacity electrodes 13 and is at the same potential as that of the capacity electrodes 13. The alignment film AL2 covers the common electrode CE. The liquid crystal layer LC is located between the main surface 10B and the main surface 20A and is in contact with the alignment films AL1 and AL2. In the first substrate SUB1, the insulating films 11 and 12, the capacity electrodes 13, the switching elements SW, the pixel electrodes PE and the alignment film AL1 are located between the main surface 10B and the liquid crystal layer LC. In the second substrate SUB2, the light-shielding layers BM, the common electrode CE and the alignment film AL2 are located between the main surface 20A and the liquid crystal layer LC.

The transparent substrates 10 and 20 are insulating substrates such as glass substrates or plastic substrates. The main surfaces 10A and 10B, the main surfaces 20A and 20B are surfaces substantially parallel to the X-Y plane. The insulating film 11 is formed of a transparent insulation material such as silicon oxide, silicon nitride, silicon oxynitride, acryl resin or the like. For example, the insulating film 11 includes an inorganic insulating film and an organic compound insulator. The insulating film 12 is an inorganic insulating film such as of silicon nitride or the like. The capacity electrodes 13, the pixel electrodes PE and the common electrode CE are transparent electrodes formed of a transparent conductive material such as indium tin oxide (ITO), indium zinc oxide (IZO) or the like. The light-shielding layer BM is an electroconductive layer having a resistance lower than, for example, that of the common electrode CE. For example, the light-shielding layers BM are each formed of an untransparent metal material such as molybdenum, aluminum, tungsten, titanium, silver or the like. The alignment films AL1 and AL2 are horizontal alignment films substantially parallel to the X-Y plane and having an alignment restriction force. For example, the alignment films AL1 and AL2 are subjected to alignment treatment along the first direction X. Note that the alignment treatment may be a rubbing treatment or an optical alignment treatment.

Figure 3:
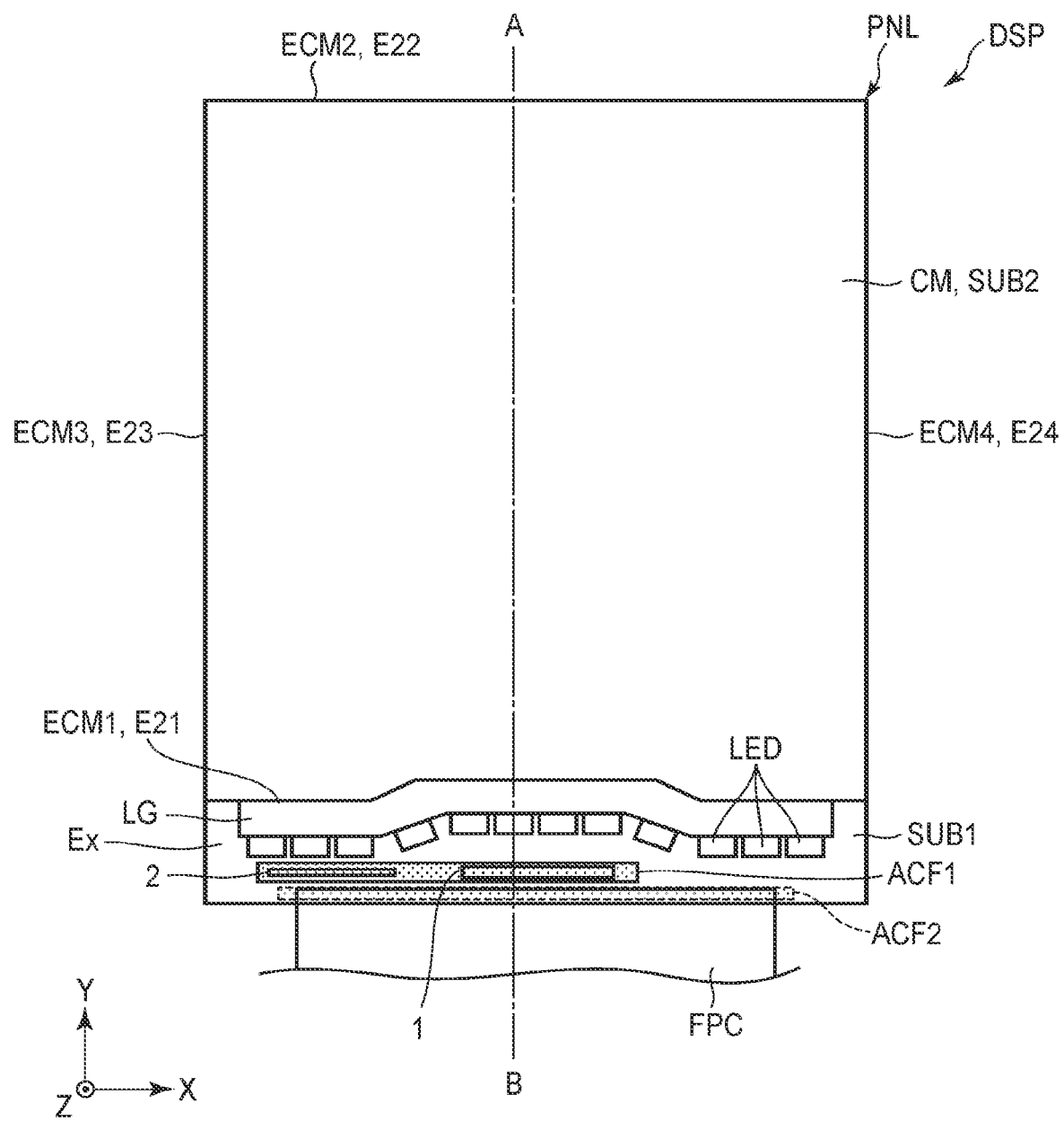
FIG. 3 is another plan view showing a configuration example of the display device according to the first embodiment.

FIG. 3 is another plan view showing the configuration example of the display device DSP of this embodiment. In FIG. 3, the illustration of the first wiring substrate LEDFPC shown in FIG. 1 is omitted, and various structures located below the first wiring substrate LEDFPC and a cover member CM located above the second substrate SUB2 are illustrated.

As shown in FIG. 3, the display device DSP further comprises a first driver 1, a second driver 2, an anisotropic conductive film ACF1, the second wiring substrate FPC, an anisotropic conductive film ACF2, a cover member CM, a light guide LG and light-emitting devices LED. The cover member CM may be referred to as the third transparent substrate.

The first driver 1 and the second driver 2 are mounted on the extended portion Ex of the first substrate SUB1 via the anisotropic conductive film ACF1. The first driver 1 drives, for example, signal lines S and functions as a signal-line drive circuit configured to output vides signals to the pixels PX. The second driver 2 functions as a scanning-line drive circuit configured to drive scanning lines G, for example. The second wiring substrate FPC is mounted on the extended portion Ex of the first substrate SUB1 via the anisotropic conductive film ACF2. The second wiring substrate FPC is a bendable flexible printed circuit board. The second wiring substrate FPC is electrically connected to a circuit board (not shown). The first driver 1 and the second driver 2 is electrically connected to a circuit board (not shown) via the second wiring substrate FPC. Note that the first driver 1 and the second driver 2 may be mounted on the second wiring substrate FPC.

The cover member CM is disposed on the main surface 20B of the transparent substrate 20 of the second substrate SUB2. The cover member CM is superposed on the second substrate SUB2 (transparent substrate 20) in planar view. The cover member CM is formed of, for example, a transparent resin such as of clear glass, polymethyl methacrylate (PMMA), polycarbonate (PC) or the like. The cover member CM includes an end portion ECM1 at least partially extending along the first direction X, an end portion ECM2 extending along the first direction X, and end portions ECM3 and ECM4 extending along the second direction Y. The end portion ECM1 may be referred to as the third end portion. In the example illustrated, the end portions E21 and ECM1 are superposed in planar view, and so are the end portions E22 and ECM2, the end portions E23 and ECM3 and the end portions E24 and ECM4. That is, the end portion ECM1 comprise a concavity formed into a tapered shape as the case of the end portion E21.

The light guide LG is formed into a polyhedron elongated along the end portion ECM1 of the cover member CM. The light guide LG is formed into a polyhedron comprising a convexity superposing the concavity of the end portions E21 and ECM1 in planar view and a concavity opposing the convexity. The light guide LG is located between a structure of the cover member CM and the second substrate SUB2 (transparent substrate 20) and light-emitting devices LED.

The light-emitting devices LED are arranged at intervals along corresponding ones of the surfaces constituting the light guide LG, which respectively oppose those surfaces extending along the end portion ECM1. The light-emitting devices LED are disposed above the extended portion Ex of the first substrate SUB1 and are electrically connected to the first wiring substrate LEDFPC shown in FIG. 1. The light-emitting devices LED are, for example, light-emitting diodes. Light emitted from the light-emitting devices LED is transmitted through the light guide LG and enters the display panel PNL from the end portion ECM1 of the cover member CM and the end portion E21 of the second substrate SUB2.

FIG. 4 is an enlarged cross-sectional view showing the surroundings of the extended portion Ex of the display device DSP shown in FIGS. 1 and 3, and is a cross section of the display device DSP taken along line A-B shown in FIG. 3.

As shown in FIG. 4, the display device DSP further comprises a transparent adhesive layer OCA1, a touch panel film TF, a touch panel cover member TCM, a transparent adhesive layer OCA2, an adhesive layer AD1, an adhesive layer AD2, an adhesive layer AD3 and a connection layer LA.

Below the first substrate SUB1, the transparent adhesive layer OCA1, the touch panel film TF, the touch panel cover member TCM are stacked on one another in this order. The touch panel film TF is adhered to the main surface 10A of the first substrate SUB1 via the transparent adhesive layer OCA1. The touch panel film TF has, for example, a two-layered structure, which includes a touch panel TP and an adhesive layer AD4. The touch panel cover member TCM is adhered to the touch panel film TF by the adhesive layer AD4 of the touch panel film TF.

The transparent adhesive layer OCA2 is located between the second substrate SUB2 and the cover member CM, and adheres the second substrate SUB2 and the cover member CM together. The transparent adhesive layer OCA2 is provided over substantially the entire surface of the main surface 20B of the second substrate SUB2.

The adhesive layer AD1 adheres the cover member CM and the first wiring substrate LEDFPC together. The adhesive layer AD2 adheres the light guide LG and the first substrate SUB1 together. The adhesive layer AD3 adheres the light guide LG and the first wiring substrate LEDFPC together. The adhesive layer AD1 comprises a reflective member M1, the adhesive layer AD2 comprises a reflective member M2, and the adhesive layer AD3 comprises a reflective member M3. The adhesive layers AD1, AD2 and AD3 each are, for example, a multilayered structure in which an adhesive, a reflective member and an adhesive stacked in this order. For example, the adhesive layer AD1, AD2, AD3 are each formed from a double-faced tape. The reflective members M1, M2 and M3 each are formed of, for example, a highly reflective metal material such as aluminum, molybdenum, titanium, silver or the like.

The connection layer LA electrically connects the first wiring substrate LEDFPC and the light-emitting device LED to each other. The connection layer LA is formed of solder.

As shown in FIG. 4, the light-emitting device light LED is mounted on the first wiring substrate LEDFPC via the connection layer LA. The light-emitting devices LED is opposed across the light guide LG with the end portion ECM1 of the cover member CM and the end portion E21 of the second substrate SUB2. When the light emitted from the light-emitting devices LED enters from the surface of the light guide LG, and travels in the light guide LG while being reflected by the upper surface and the lower surface of the light guide LG. The light travelling in the light guide LG is output from the other surface of the light guide LG, and then enters the cover member CM and the second substrate SUB2 from the end portion ECM1 of the cover member CM and the end portion E21 of the second substrate SUB2.

Note that, of the light travelling in the light guide LG, light having passed the lower surface of the light guide LG is reflected by reflective member M2 of the adhesive layer AD2 and returns again to light guide LG and travels in the light guide LG. Therefore, the light travelling in the light guide LG never reaches the metal wiring lines provided on the first substrate SUB1. With this structure, it is possible to suppress the light travelling in the light guide LG from being scattered by the metal wiring lines provided on the first substrate SUB1, and thus the degradation in display quality can be prevented.

Meanwhile, of the light travelling in the light guide LG, the light having passed the upper surface of the light guide LG is reflected by the reflective member M3 of the adhesive layer AD3, and returns again to the light guide LG and travels in the light guide LG. Therefore, the light travelling in the light guide LG never reaches the first wiring substrate LEDFPC. With this structure, it is possible to suppress the light travelling in the light guide LG from being scattered by the first wiring substrate LEDFPC, and thus the degradation in display quality can be prevented.

Note that it is preferable that gray printing be carried out on the reflective member M1 of the adhesive layer AD1 described above. With this structure, the lightness of the light entering the cover member CM and the second substrate SUB2 can be adjusted. More specifically, it is possible to suppress(adjust) the lightness of the light reflected by the reflective member M1 of the adhesive layer AD1, of the light entering the cover member CM and the second substrate SUB2.

As shown in FIG. 4, the display device DSP according to this embodiment comprises an interval (space) of a distance d1 between the light-emitting devices LED and the first driver 1. The distance d1 approximates a depth of the concavity (a length along the second direction Y) of the end portion ECM1 of the cover member CM and the end portion E21 of the second substrate SUB2. In other words, in the display device DSP of this embodiment, the light-emitting devices LED and the first driver 1 can be disposed to be away from each other by the depth of the concavity formed in the end portion ECM1 of the cover member CM and the end portion E21 of the second substrate SUB2. With this structure, the heat generated from the light-emitting devices LED when they are on, and the heat generated from the first driver 1 while driven, can be fully radiated in the space. Thus, it is possible to prevent such drawbacks, which include, for example, breaking down of the first driver 1, which may be caused when the temperature of the first driver 1 exceeds its heatproof temperature.

Here, an advantageous effect of the display device DSP according to this embodiment will be described using a comparative example thereof. Note that the comparative example is only provided to describe a part of the effect that can be exhibited by the display device DSP of this embodiment and does not exclude an effect common to the comparative example and this embodiment from the scope of the present invention.

Figure 5:
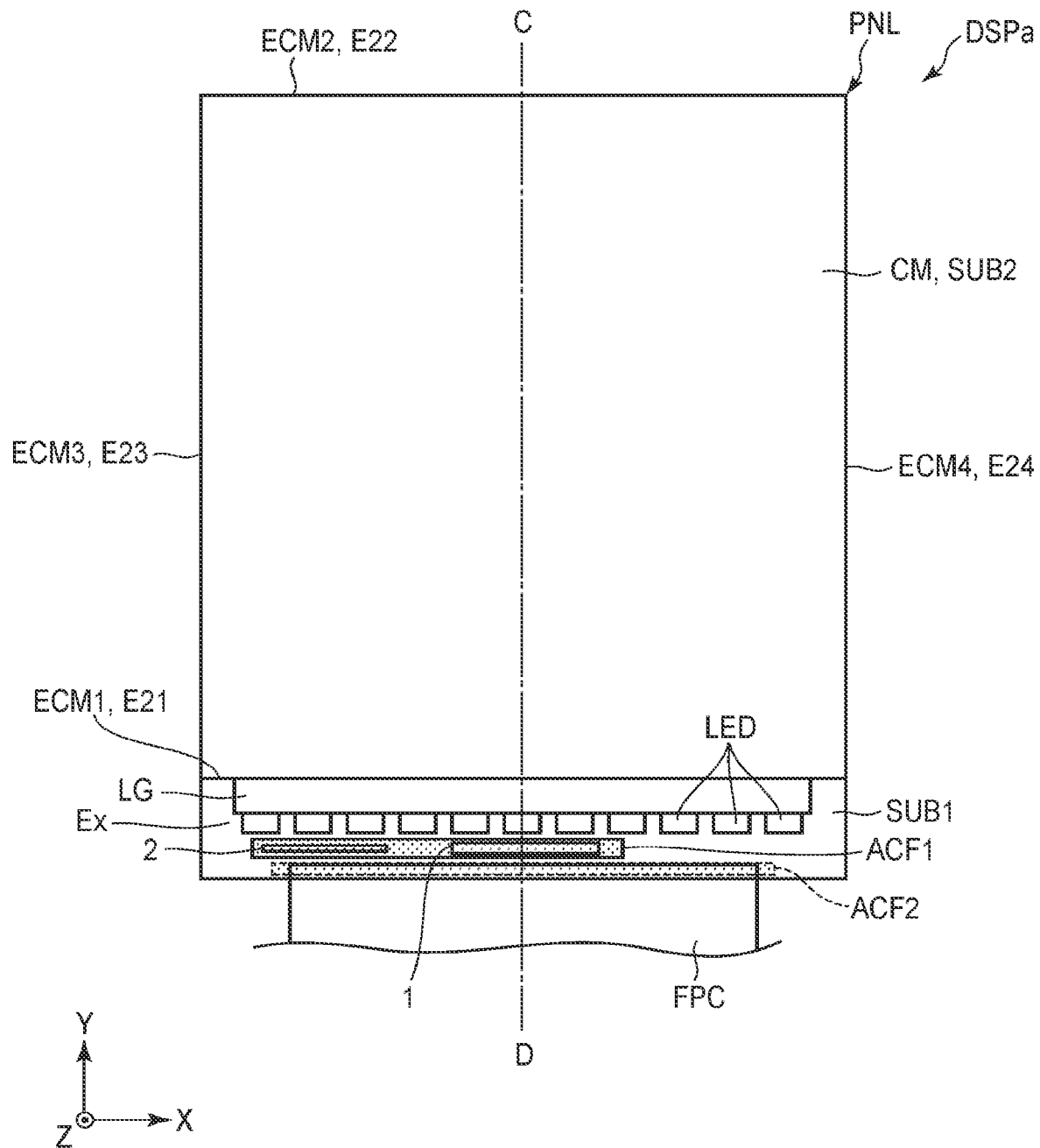
FIG. 5 is a plan view showing a configuration example of a display device according to a comparative example.

FIG. 5 is a plan view of a display device DSPa according to the comparative example, and FIG. 6 is a cross-sectional view of the display device DSPa of the comparative example. As shown in FIGS. 5 and 6, the display device DSPa of the comparative example is different from the display device DSP of the present embodiment in that the cover member CM and the second substrate SUB2 are rectangular. Further, since the cover member CM and the second substrate SUB2 are rectangular, the light guide LG has a rectangular parallelepiped shape, and light-emitting devices LED are arranged at intervals along the rectangular parallelepiped-formed light guide LG, in other words, along the first direction X. In this respect as well, the comparative example differs from this embodiment.

In the display device DSPa of the comparative example, the cover member CM and the second substrate SUB2 are rectangular, and the light guide LG has a rectangular parallelepiped shape, and therefore, as shown in FIGS. 5 and 6, only an interval of a distance da (<d1) is provided between the light-emitting devices LED and the first driver 1. With this structure, the heat generated from the light-emitting devices LED when they are on, and the heat generated from the first driver 1 while driven, cannot be fully radiated, and therefore the temperature of the first driver 1 exceeds its heatproof temperature, possibly causing breaking down of the first driver 1, undesirably.

On the other hand, in the display device DSP according to this embodiment, a tapered concavity is formed in portions of the end portion ECM1 of the cover member CM and the end portion E21 of the second substrate SUB2, which oppose the first driver 1. The tapered concavity has a depth of approximately a distance d1 (>da). Further, in the display device DSP according to this embodiment, the light guide LG has a shape corresponding to the tapered concavity formed in the end portion ECM1 of the cover member CM and the end portion E21 of the second substrate SUB2. With this structure, the light-emitting devices LED and the first driver 1 can be placed to be away from each other by the distance approximate to the depth of the concavity formed in the end portion ECM1 of the cover member CM and the end portion E21 of the second substrate SUB2. With this structure, the heat generated from the light-emitting devices LED when they are on, and the heat generated from the first driver 1 while driven, can be fully radiated in the space. Thus, it is possible to prevent such drawbacks as described above.

Note that in this embodiment, the display device DSP comprises a tapered concavity formed in portions of the end portion ECM1 of the cover member CM and the end portion E21 of the second substrate SUB2, which oppose the first driver 1. However, the shape of the concavity formed in the end portion ECM1 of the cover member CM and the end portion E21 of the second substrate SUB2 may not be tapered, but may be of an arbitrary shape including, for example, hemispherical, as long as the light-emitting devices LED and the first driver 1 are placed away from each other.

Second Embodiment

Next, the second embodiment will be described. A display device DSP1 according to the second embodiment is different from the display device DSP of the first embodiment described above in that a light guide LG is not provided between the cover member CM or the second substrate SUB2, and the light-emitting devices LED. In the following description, basically, points differing from those described in the first embodiment will be described.

Figure 7:
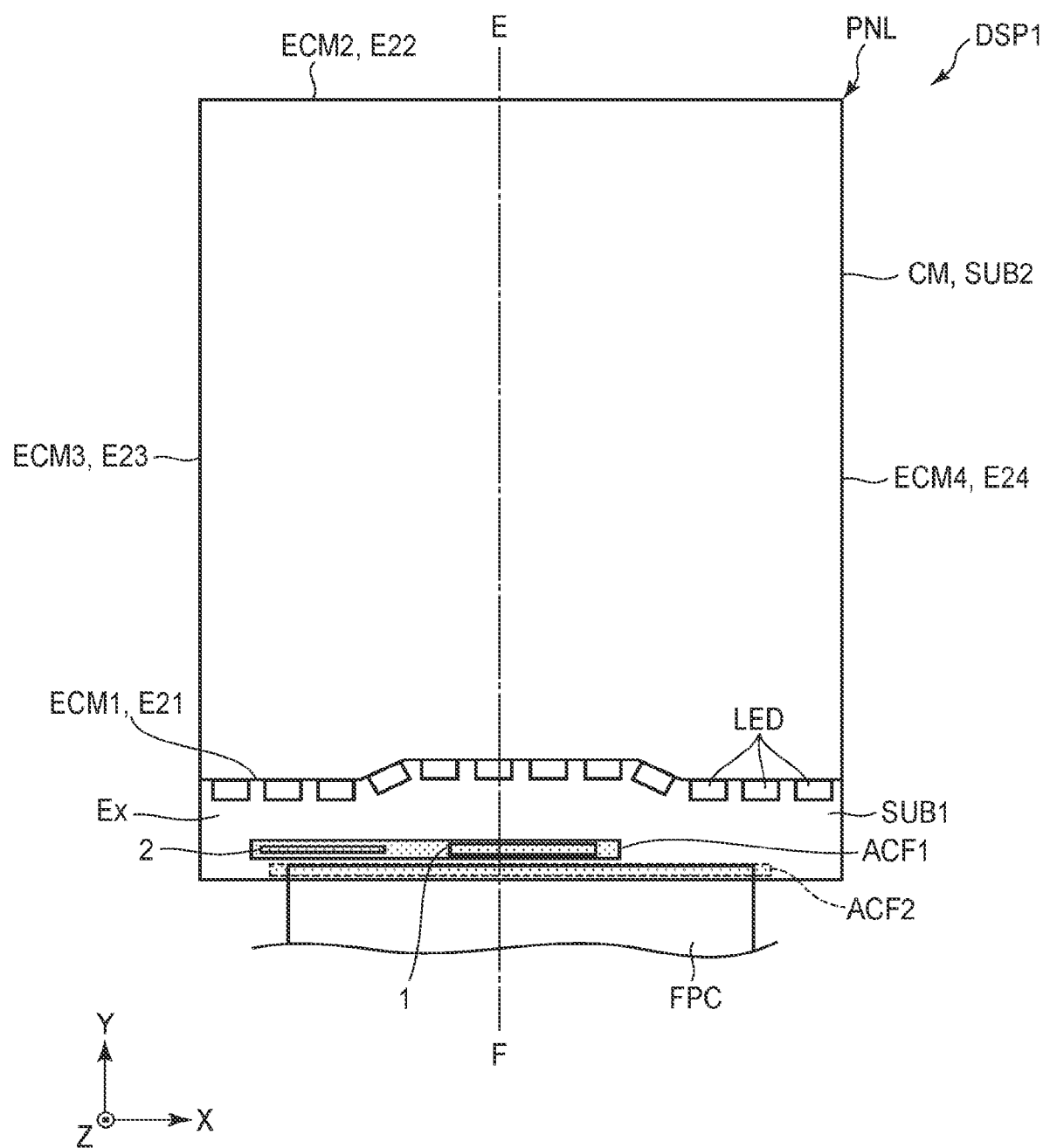
FIG. 7 is a plan view showing a configuration example of a display device according to a second embodiment.

FIG. 7 is a plan view showing a configuration example of a display device DSP according to this embodiment. As shown in FIG. 7, a tapered concavity is formed in portions of the end portion ECM1 of the cover member CM and the end portion E21 of the second substrate SUB2, which oppose the first driver 1, in the display device DSP1 as in the first embodiment described above. But, as shown in FIG. 7, the display device DSP1 of this embodiment does not comprise a light guide LG, and therefore, in the display device DSP1 of this embodiment, light-emitting devices LED are arranged at intervals along the end portion ECM1 of the cover member CM and the end portion E21 of the second substrate SUB2.

FIG. 8 is a cross-sectional view of the display device DSP1 taken along line E-F shown in FIG. 7. As shown in FIG. 8, the light-emitting devices LED opposes the end portion ECM1 of the cover member CM and the end portion E21 of the second substrate SUB2. In the example illustrated, between the light-emitting devices LED and the end portion ECM1 of the cover member CM or the end portion E21 of the second substrate SUB2, an interval of a distance, for example, 0.2 mm or less is provided. Note that distance between the light-emitting devices LED and the end portion ECM1 of the cover member CM or the end portion E21 of the second substrate SUB2 may be zero. In other words, the light-emitting devices LED may be brought into contact with the end portion ECM1 of the cover member CM and the end portion E21 of the second substrate SUB2.

As shown in FIG. 8, the display device DSP1 according to this embodiment comprises an interval (space) of a distance d2 (>d1) between the light-emitting devices LED and the first driver 1. The distance d2 is approximate to a sum of the depth of the concavity formed in the end portion ECM1 of the cover member CM and the end portion E21 of the second substrate SUB2 and the width (the length along the second direction Y) of the light guide LG of the first embodiment described above.

According to the second embodiment described, the light-emitting devices LED and the first driver 1 can be placed to be away from each other in the display device DSP1 by the distance approximate to the sum of the depth of the concavity formed in the end portion ECM1 of the cover member CM and the end portion E21 of the second substrate SUB2 and the width of the light guide LG described in the first embodiment. With this structure, the heat generated from the light-emitting devices LED when they are on, and the heat generated from the first driver 1 while driven, can be fully radiated in the space. Thus, it is possible to prevent such drawbacks as described above.

Further, according to the second embodiment, the light emitted from the light-emitting devices LED can be directly made incident on the cover member CM and the second substrate SUB2 from the end portion ECM1 of the cover member CM and the end portion E21 of the second substrate SUB2. With this structure, it is possible to make unattenuated light incident on the cover member CM and the second substrate SUB2, and therefore the luminance can be improved as compared to the case there the light is made incident on the cover member CM and the second substrate SUB2 through the light guide LG. That is, the display quality of the display device DSP1 can be improved.

Third Embodiment

Next, the third embodiment will be described. A display device DSP2 according to the third embodiment is different from the display device DSP1 of the second embodiment described above in that a heat radiation member TIM is provided between the light-emitting devices LED and the first driver 1. In the following description, basically, points differing from those described in the second embodiment will be described.

Figure 9:
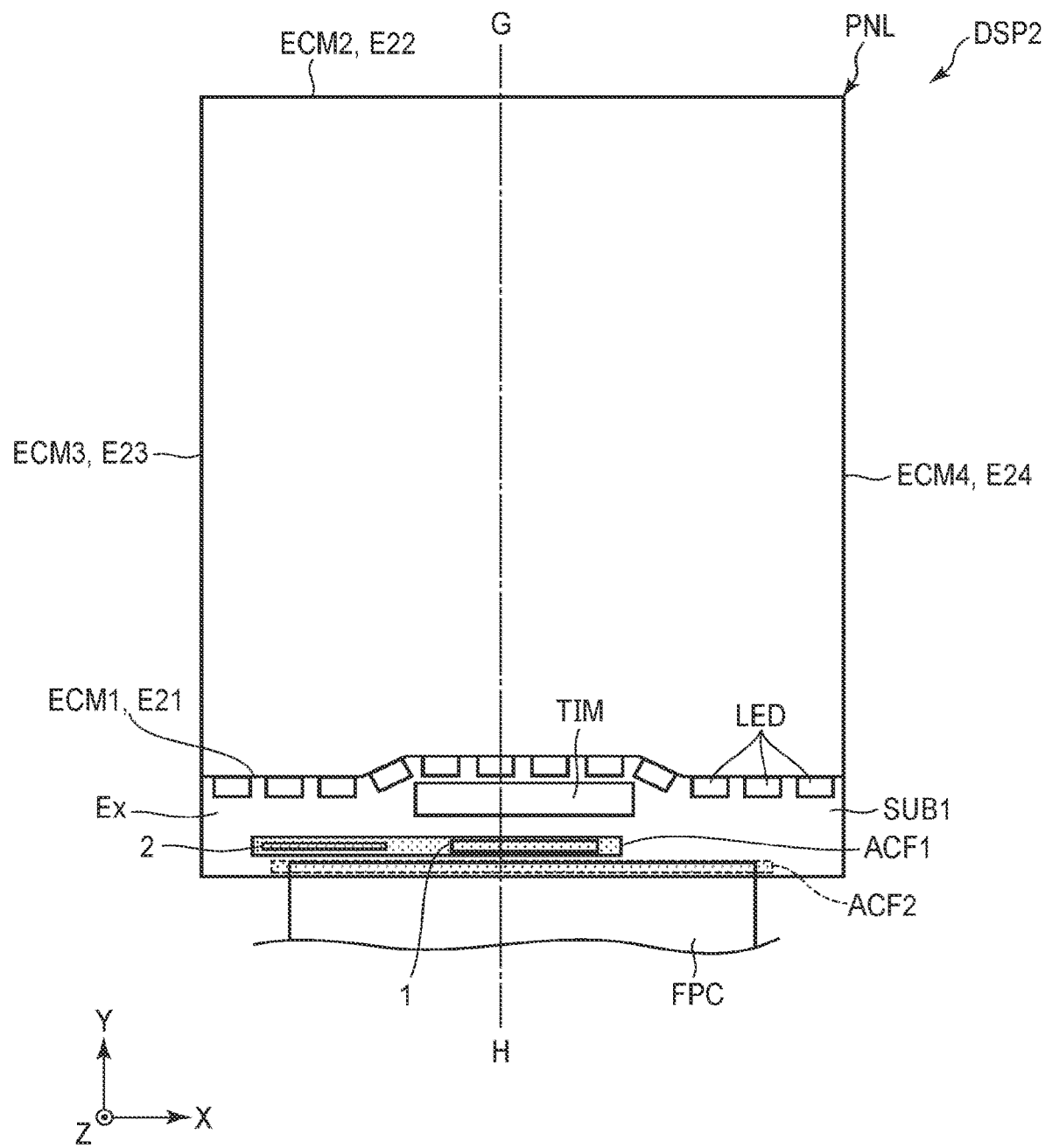
FIG. 9 is a plan view showing a configuration example of a display device according to a third embodiment.

FIG. 9 is a plan view showing a configuration example of a display device DSP 2 according to this embodiment. As shown in FIG. 9, in the display device DSP2, a tapered concavity is formed in portions of the end portion ECM1 of the cover member CM and the end portion E21 of the second substrate SUB2, which oppose the first driver 1 as in the case of the second embodiment described above. Further, in the display device DSP2, light-emitting devices LED are arranged at intervals along the end portion ECM1 of the cover member CM and the end portion E21 of the second substrate SUB2 as in the case of the second embodiment described above. But, as shown in FIG. 9, a heat radiation member TIM is provided between the light-emitting devices LED and the first driver 1 in the display device DSP2 according to this embodiment.

Figure 10:
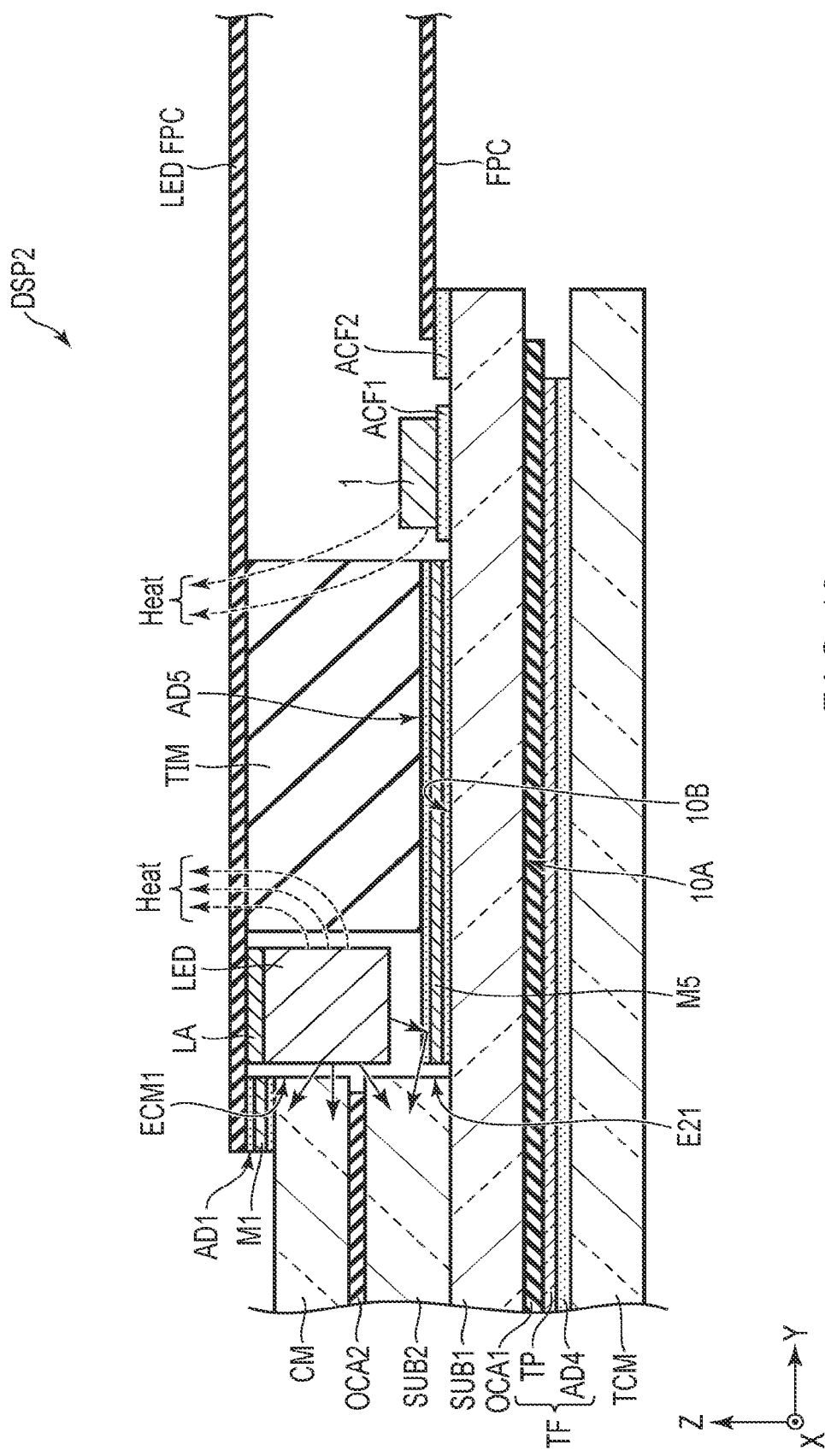
FIG. 10 is a cross section taken along line G-H indicated in FIG. 9.

FIG. 10 is a cross-sectional view of the display device DSP2 taken along line G-H shown in FIG. 9. As shown in FIG. 10, the display device DSP2 according to this embodiment comprises a heat radiation member TIM between the light-emitting devices LED and the first driver 1. From the viewpoint of efficiency in heat radiation, it is preferable that an upper surface of the heat radiation member TIM be in contact with the first wiring substrate LEDFPC. It suffices if the heat radiation member TIM is formed from a material which can radiate heat to the outside via the first wiring substrate LEDFPC, and it is formed from, for example, a resin material or a metal material.

The heat radiation member TIM is adhered to the extended portion Ex of the first substrate SUB1 via an adhesive layer AD5. The adhesive layer AD5 is provided between the end portion E21 of the second substrate SUB2 and the first driver 1. The adhesive layer AD5 comprises a reflective member M5, and is a multilayered structure in which, for example, an adhesive, a reflective member and an adhesive are stacked in this order. The reflective member M5 is formed of, for example, a highly reflective metal material such as aluminum, molybdenum, titanium, silver or the like.

According to the third embodiment described above, the display device DSP2 comprises the taper concavity formed in the end portion ECM1 of the cover member CM and the end portion E21 of the second substrate SUB2, and the heat radiation member TIM placed in the space made available by not providing the light guide LG. With this structure, as indicated by an arrow in FIG. 10, the heat generated from the light-emitting devices LED when they are on, and the heat generated from the first driver 1 while driven, can be fully radiated to the outside via the first wiring substrate LEDFPC. Thus, it is possible to prevent such drawbacks as described above.

Further, according to the third embodiment, the display device DSP2 comprises the adhesive layer AD5 which extends to below the light-emitting devices LED and includes the reflective member M5. The reflective member M5 reflects light irradiated from the light-emitting devices LED therebelow and makes it incident on the second substrate SUB2 mainly from the end portion E21 of the second substrate SUB2. With this structure, the light can enter the cover member CM and the second substrate SUB2 more as compared to the case where the adhesive layer AD5 including the reflective member M5 is not provided below the light-emitting devices LED, thereby making it possible to improve the luminance. That is, the display quality of the display device DSP2 can be improved.

Note that the heat radiation member TIM provided between the light-emitting devices LED and the first driver 1 may be provided, for example, so as to cover the first driver 1 as shown in FIG. 11. With such a structure that the first driver 1 is covered by the heat radiation member TIM, it is possible to prevent the occurrence of such drawbacks, which include, for example, the entering of moisture from the outside, which may cause corrosion of the first driver 1.

According to at least one of the embodiments described above, a transparent display (display device) which can radiate heat generated from the light source when it is on, and the heat generated from various drivers while they are driven, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first transparent substrate including a first end portion;
a second transparent substrate including a second end portion and opposing the first transparent substrate;
a third transparent substrate including a third end portion and opposing the second transparent substrate; and
a plurality of light-emitting devices provided along the second end portion, wherein
the first transparent substrate comprises a first driver provided in a first region located between the first end portion and the second end portion and located without overlapping the second transparent substrate in a planar view,
the second end portion includes a concavity,
at least one first light-emitting device of the plurality of light-emitting devices, provided along the concavity, opposes the first driver with a predetermined interval therebetween,
the third end portion has a shape formed along the concavity, and
the concavity is formed in the second end portion and the third end portion.

2. The display device of claim 1, wherein
the second end portion and the third end portion overlap in the planar view, and
the first end portion is provided without overlapping the second end portion and the third end portion in the planar view.

3. The display device of claim 1, further comprising:
a heat radiation member provided between the first light-emitting device and the first driver.

4. The display device of claim 3, wherein
the heat radiation member covers the first driver.

5. The display device of claim 3, further comprising:
a reflective member provided between the second end portion and the first driver and extending below the plurality of light-emitting devices and the heat radiation member.

6. The display device of claim 5, wherein
the reflective member overlaps the plurality of light-emitting devices in the planar view.

7. The display device of claim 1, wherein
the plurality of light-emitting devices oppose the second end portion and the third end portion.

8. The display device of claim 7, wherein
an interval between the plurality of light-emitting devices and the second end portion or the third end portion is 0.2 mm or less.

9. The display device of claim 8, wherein
the plurality of light-emitting devices are in contact with the second end portion and the third end portion.

10. The display device of claim 1, wherein
the plurality of light-emitting devices are electrically connected to a first wiring substrate provided on the third transparent substrate.

11. The display device of claim 10, wherein
the third transparent substrate and the first wiring substrate are adhered to each other via an adhesive layer provided on the third transparent substrate.

12. The display device of claim 11, wherein
the first wiring substrate comprises a convexity superposing the concavity in the planar view.

13. The display device of claim 1, wherein
the first driver outputs a video signal to a plurality of pixels arranged in a matrix.

14. A display device comprising:
a first transparent substrate including a first end portion;
a second transparent substrate including a second end portion and opposing the first transparent substrate;
a third transparent substrate including a third end portion and opposing the second transparent substrate;
a plurality of light-emitting devices opposing the second end portion and the third end portion; and
a light guide provided between the second end portion or the third end portion, and the plurality of light-emitting devices, wherein
the first transparent substrate comprises a first driver provided in a first region located between the first end portion and the light guide and located without overlapping the second transparent substrate and the third transparent substrate in a planar view,
the second end portion and the third end portion include a first concavity,
the light guide includes a convexity overlapping the first concavity in the planar view and a second concavity opposing the convexity, and
at least one first light-emitting device of the plurality of light-emitting devices, provided along the second concavity is spaced apart from the first driver with a predetermined interval therebetween.

* * * * *